US012800770B2

(12) United States Patent
Guertin et al.

(10) Patent No.: US 12,800,770 B2
(45) Date of Patent: Nov. 17, 2026

(54) VELOCITY MEASUREMENT BY COMPARISON OF INDEPENDENT LASERS

(71) Applicant: Rosemount Aerospace Inc., Burnsville, MN (US)

(72) Inventors: Timothy G. Guertin, Lakeville, MN (US); Mark Sherwood Miller, Lakeville, MN (US); Ryan Madson, Burnsville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 539 days.

(21) Appl. No.: 18/380,426

(22) Filed: Oct. 16, 2023

(65) Prior Publication Data

US 2025/0123400 A1 Apr. 17, 2025

(51) Int. Cl.
*G01P 3/36* (2006.01)
*G01P 5/26* (2006.01)
(Continued)

(52) U.S. Cl.
CPC ................ *G01S 17/95* (2013.01); *G01P 5/26* (2013.01); *G01P 13/025* (2013.01);
(Continued)

(58) Field of Classification Search
CPC . G01S 7/95; G01S 7/58; G01S 7/4814; G01S 7/4816; G01P 5/26
See application file for complete search history.

(56) References Cited

U.S. PATENT DOCUMENTS 4,988,190 A 1/1991 Miles
6,297,878 B1 * 10/2001 Miller ..................... G01S 17/58 356/28.5

(Continued)

FOREIGN PATENT DOCUMENTS

CN 115560948 A 1/2023
EP 2133712 A1 * 12/2009 .............. F03D 7/02

OTHER PUBLICATIONS

European Search Report received in EP Application No. 24205028.4, Mar. 14, 2025, 10 pages.

(Continued)

*Primary Examiner* — Mark Hellner
(74) *Attorney, Agent, or Firm* — Suiter Swantz IP

(57) ABSTRACT

A method includes emitting scanned reference laser light from a first tunable laser into a first atomic vapor filter to output filtered scanned reference laser light and receiving the filtered reference laser light with a first detector. The method includes emitting scanned outgoing signal laser light from a second tunable laser into an atmospheric space, receiving a return of the scanned signal laser light from Doppler shifted scattering from the atmospheric space into a second atomic vapor filter to output Doppler shifted filtered scanned signal laser light, and receiving the Doppler shifted filtered scanned signal laser light with a second detector. Each tunable laser wavelength scan is controlled independently using information from the wavelength scan received at the associated detector to maintain the center of the wavelength scan received at the detector as the bottom of an atomic absorption well. Velocity is determined using the Doppler shift of the light collected from atmospheric space as measured by the wavelength difference between the center wavelength of the scanned reference laser and the (Continued)

center wavelength of the scanned outgoing signal laser light which is transmitted into the atmosphere.

15 Claims, 3 Drawing Sheets

(51) Int. Cl.

| | |
|---|---|
| ***G01P 13/02*** | (2006.01) |
| ***G01S 7/481*** | (2006.01) |
| ***G01S 17/58*** | (2006.01) |
| ***G01S 17/95*** | (2006.01) |

(52) U.S. Cl.
CPC .......... *G01S 7/4814* (2013.01); *G01S 7/4816* (2013.01); *G01S 17/58* (2013.01)

(56) References Cited

U.S. PATENT DOCUMENTS

| | | | | |
|---|---|---|---|---|
| 8,072,584 | B2 | 12/2011 | Caldwell et al. | |
| 8,352,187 | B2 | 1/2013 | Perrie et al. | |
| 8,675,184 | B2 | 3/2014 | Schmitt et al. | |
| 8,718,971 | B2 | 5/2014 | Mandle | |
| 11,300,584 | B2 | 4/2022 | Caldwell et al. | |
| 11,686,742 | B2 | 6/2023 | Naslund et al. | |
| 2009/0046289 | A1* | 2/2009 | Caldwell | G01P 13/025 356/341 |
| 2009/0051896 | A1* | 2/2009 | Caldwell | G01S 7/4812 356/28 |
| 2019/0302141 | A1 | 10/2019 | Caldwell et al. | |
| 2023/0028596 | A1 | 1/2023 | Michel et al. | |

OTHER PUBLICATIONS

J. H. Grinstead et al., “Frequency-modulated filtered Rayleigh scattering (FM-FRS)—A new technique for real-time velocimetry,” AIAA Meeting Papers on Disc. Jan. 1996.

J. H. Grinstead et al., “Doppler velocimetry in a supersonic jet by use of frequency-modulated filtered light scattering,” Optics Letters, vol. 22, No. 5, 331-333, (1997).

J. H. Ginstead et al., “Frequency-locked light scattering: real-time Doppler velocimetry with closed-loop feedbcak control,” Applied Optics, vol. 37, No. 9, 1617-1625, (1998).

* cited by examiner

VELOCITY MEASUREMENT BY COMPARISON OF INDEPENDENT LASERS

BACKGROUND

1. Field

The present disclosure relates to air data measurements, and more particularly to laser based air data systems for aircraft.

2. Description of Related Art

There is an industry wide push for dissimilar air data sensing (compared to traditional pneumatics probes). The Laser Air Data System (LADS) is a flush mount Light Detection and Ranging (LIDAR) system for measuring air data parameters such as True Air Speed (TAS) and provides dissimilar failure modes from pneumatic systems such as bird strike, volcanic ash, and ice ingestion. The detection method utilizes Rayleigh-Brillouin and Mie backscattering to measure air data parameters and can function in high Mie to no particulate loaded environments.

The conventional techniques have been considered satisfactory for their intended purpose. However, there is an ever present need for improved systems and methods for LIDAR based air data measurements for aircraft and the like. This disclosure provides a solution for this need.

SUMMARY

A method includes emitting scanned reference laser light from a first tunable laser into a first atomic vapor filter to output filtered scanned reference laser light and receiving the filtered reference laser light with a first detector. The method includes emitting scanned outgoing signal laser light from a second tunable laser into an atmospheric space, receiving a return of the scanned signal laser light from Doppler shifted scattering from the atmospheric space into a second atomic vapor filter to output Doppler shifted filtered scanned signal laser light, and receiving the Doppler shifted filtered scanned signal laser light with a second detector. The method includes controlling the center wavelength of the scanned outgoing signal laser light of the second tunable laser to continuously maintain the Doppler shifted filtered scanned signal light on the center of an absorption well related to the second atomic vapor filter as the air velocity changes in the atmospheric space.

Emitting scanned reference laser light from a first tunable laser can include cycling the reference light over a limited range of reference wavelengths centered on a reference absorption well related to the first atomic vapor filter. The method can include calculating air speed data based on the difference between the center wavelength of the scanned outgoing signal laser light and the center wavelength of the scanned reference laser light. The method can include outputting the air speed data to a consuming system of an aircraft.

Controlling scanned outgoing signal laser light wavelength of the second tunable laser can include using engine or other aircraft state data to control the limited scan wavelength range to initially center the scan wavelength range on the absorption well. Controlling scanned outgoing signal laser light wavelength of the second tunable laser can include initializing the limited scan wavelength range to center the limited scan wavelength range of the Doppler shifted filtered scanned signal light on the second atomic vapor cell absorption well at zero airspeed, and wherein the aircraft state is zero speed and grounded. Controlling scanned outgoing signal laser light wavelength of the second tunable laser can include, for wavelength cycles after initialization, iteratively stepping the limited scan wavelength range up or down for each wavelength cycle to maintain the Doppler shifted filtered scanned signal light at the center of the second atomic vapor cell absorption well. The method can include combining the reference laser light with the outgoing laser light to output combined laser light to a frequency detector, detecting a beat note in the combined laser light, and converting the beat note to air speed data.

The method can include multiple outgoing channels. This can include emitting respective outgoing laser light from at least one additional tunable laser for each respective one of one or more additional outgoing light channels, receiving respective returns of the respective outgoing laser light from the atmospheric space into a respective additional atomic vapor filter to output respective filtered scan light for each additional outgoing light channel, receiving the respective filtered scan laser light with a respective additional detector for each additional outgoing light channel, and controlling respective center wavelength of each respective outgoing laser light of the at least one additional tunable laser to continuously remain centered on a respective absorption well related to the second atomic vapor filter as the Doppler shift changes due to changes in air velocity in the atmospheric space.

A system includes a first tunable laser operatively connected to be controlled by a first laser control. A first atomic vapor filter is operatively connected to receive laser light from the first tunable laser and to pass filtered light to a first detector that is operatively connected to the first laser control for control of the first tunable laser. A plurality of transmit channels each including: a second tunable laser operatively connected to be controlled by a second laser control, a second atomic vapor filter operatively connected to receive returned laser light from the second tunable laser and to pass filtered return light to a second detector that is operatively connected to the second laser control for control of the second tunable laser, and a controller operatively connected to the first laser control and to the second laser control of each of the plurality of transmit channels. The controller is configured to perform methods as disclosed herein to determine air data from the difference in center wavelengths between the first tunable laser and the second tunable laser.

Each transmit channel can include: an amplifier operatively connected to amplify the laser light from the second tunable laser to a transceiver. The transceiver can be operatively connected to receive the amplified laser light, to transmit the amplified laser light out into an atmospheric space, and to receive Doppler shifted return light from the atmospheric space. For each transmit channel, the system can include a first optical splitter operatively connected to split light from the first tunable laser, a second optical splitter operatively connected to split light from the second tunable laser, a light combiner operatively connected to receive and combine light split from the first optical splitter and light split from the second optical splitter, and a frequency detector configured to detect a beat note in combined light from the light combiner. The controller can be configured to determine air speed based on Doppler shift apparent in the beat note detected in the frequency detector.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain FIGURES, wherein.

DETAILED DESCRIPTION OF THE PREFERRED EMBODIMENTS

Figure 1:
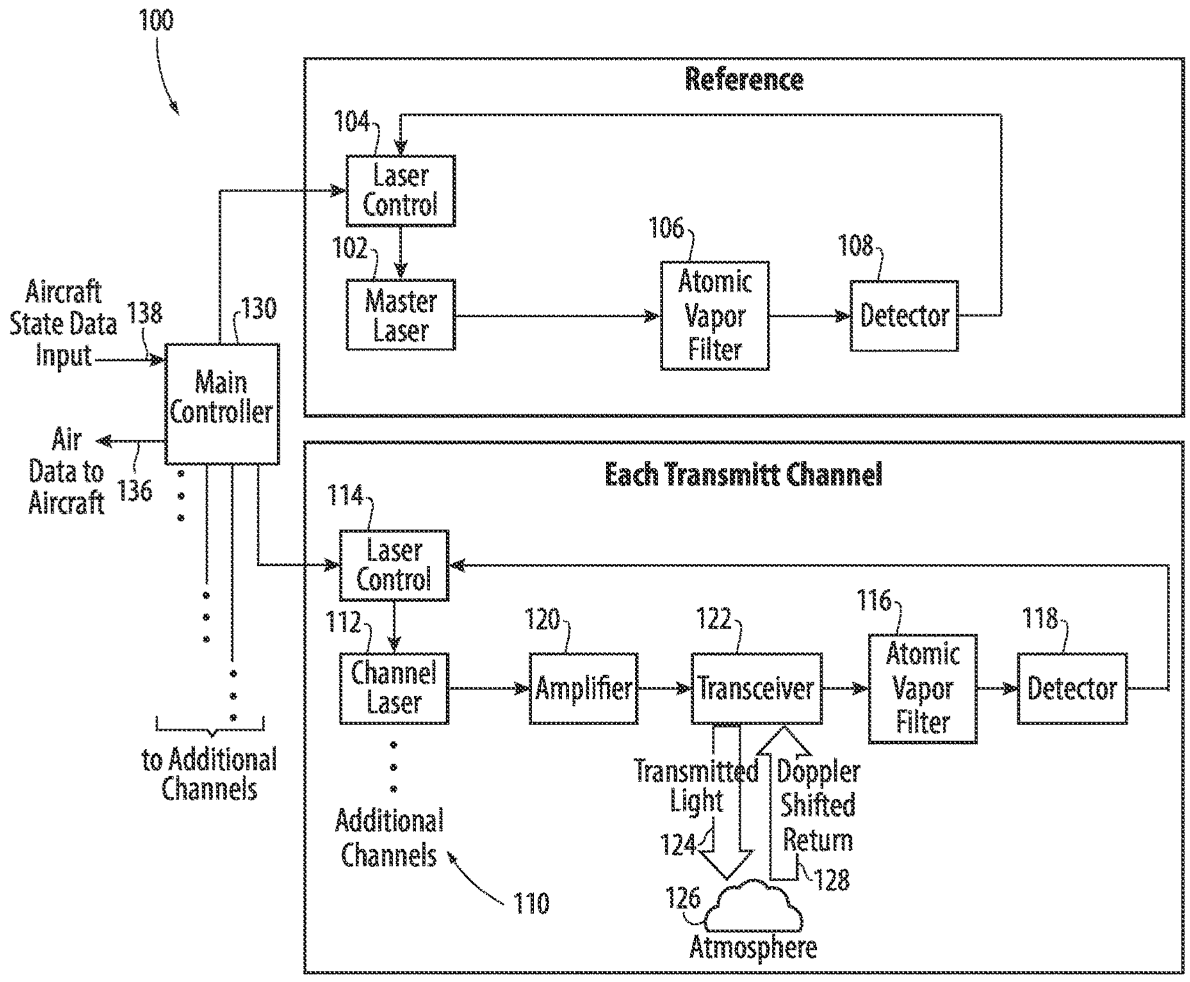
FIG. 1 is a schematic view of an embodiment of a system constructed in accordance with the present disclosure, showing the tunable reference laser, and the tunable signal laser for each channel.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-4, as will be described. The systems and methods described herein can be used to enhance signal to noise ratio in Rayleigh/Mie backscatter air data measurements such as for use onboard aircraft. As used herein, light may refer to visible light and/or electromagnetic radiation outside visible wavelengths.

The system 100 includes a first tunable laser 102 operatively connected to be controlled by a first laser control 104. A first atomic vapor filter 106 is operatively connected to receive laser light from the first tunable laser 102 and to pass filtered light to a first detector 108 that is operatively connected to the first laser control 104 for control of the first tunable laser 102, including wavelength control. A plurality of transmit channels 110 are included. In FIG. 1 only one transmit channel 110 is shown, however any suitable number of additional similarly configured channels can be included as indicated by the ellipses in FIG. 1. Each of the additional channels is configured as described here for the one channel 110 shown. The multiple channels can each be used for a different purpose, e.g. one channel can be used for forward air speed, another channel can be used for vertical air speed, another for lateral air speed, and the like. A minimum of three channels are typical in an air data system to provide three-dimensional velocity. The channels need to be pointed in different directions. The line-of-sight velocity measurement of each channel is measured. Trigonometry is used to calculate a three-dimensional velocity vector. Additional channels could be used for redundancy. In short, the system 100 can use three channels to be able to calculate three-dimensional aircraft velocity information, and additional channels beyond these three could be for redundancy or improved precision.

Each channel 110 includes a second tunable laser 112 operatively connected to be controlled by a second laser control 114. An amplifier 120 is operatively connected to amplify the laser light from the second tunable laser to a transceiver 122. Those skilled in the art will readily appreciate that an amplifier can be used to increase the magnitude of the output light, the system 100 can work with a tunable laser of sufficient magnitude where an amplifier is not needed without departing from the scope of this disclosure. The transceiver 122 is operatively connected to receive the amplified laser light from the amplifier 120, to transmit the amplified laser light 124 out into an atmospheric space 126, and to receive Doppler shifted return light 128 from the atmospheric space 126. A second atomic vapor filter 116 is operatively connected to receive Doppler shifted return light 128 from the transceiver 122 and to output filtered Doppler shifted return light to a second detector 118 that is operatively connected to the second laser control 114 for control of the second tunable laser 112, including wavelength control.

A controller 130, e.g. a main controller, is operatively connected to the first laser control 104 and to the second laser control of 114 each of the plurality of transmit channels 110. The controller 114 is configured to, for each of the plurality of transmit channels 110, control wavelength of the outgoing laser light 124 of the second tunable laser 112 to continuously remain within a limited scan wavelength range centered on an absorption well related to the atomic vapor filter 116, even when the absorption well shifts wavelength due to changes in air velocity in the atmospheric space 126.

The scan range chosen for the tunable lasers should be large enough to be able to identify the center of the absorption well, but not so large as to reduce the accuracy of the ability to lock onto the center of that absorption well. Controller 104 controls the wavelength tuning of laser 102 in its entirety to ensure that the laser wavelength sweep is exactly centered on the absorption well of the vapor cell 106. This can be done controlling the current applied to the laser, the laser cavity temperature, or in the case of an external cavity laser diode (ECLD), the voltage applied to a piezoelectric actuator controlling the position of a tuning mirror. Controller 114 controls the wavelength tuning of laser 112 in its entirety to ensure the outgoing signal laser wavelength sweep of laser 112 is adjusted to ensure that the Doppler shifted filtered scanned signal laser light 128 is also exactly centered on the absorption well of the second vapor cell 116. Because of that Doppler shift from the relative motion of the atmosphere to the laser system (in our case on an airplane), the center of the wavelength sweep for the second tunable laser will be offset from the center of the wavelength sweep for the reference laser by an amount exactly twice the Doppler shift for that relative velocity. Main controller 130 can monitor the drive signals for the two lasers and use the difference in drive signals to determine that center wavelength difference and therefore the Doppler shift. The vapor cell absorption wells are centered at fixed, known wavelengths and are identical to one another. By locking both the wavelength sweeps of the reference laser light and the Doppler shifted return light on those identical absorption lines, the center wavelengths for both lasers are be shifted with respect to one another by twice the Doppler shift.

The center wavelength of an absorption well is fixed due to the properties of the atomic vapor filter 106/116. What changes, e.g. as an aircraft moves through the atmospheric space 126, is the Doppler shifted filtered scanned signal laser light that is collected from atmospheric space. So, to keep the Doppler shifted filtered scanned signal laser light centered on that fixed absorption well, the controller 114 must shift the center of the outgoing signal laser light from the tunable laser 112 so that the Doppler shift moves that light to the center of the absorption well. As the relative velocity of the air changes, the Doppler shift amount changes, and the center wavelength of the tunable laser light 112 necessary to keep the Doppler shifted return light centered on the absorption well needs to be adjusted.

Figure 3:
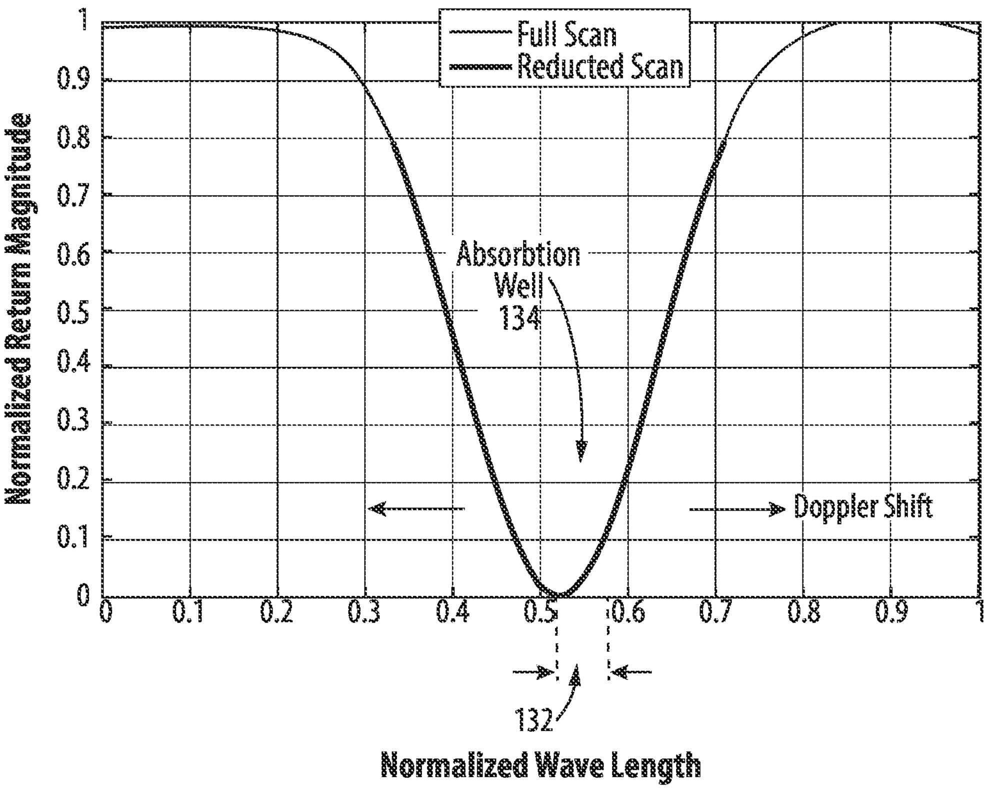
FIG. 3 is a graph showing the limited wavelength scan range centered on an absorption well.

The method includes controlling wavelength, e.g. using laser control 114, of the outgoing signal laser light of the second tunable laser 112 of each channel 110 such that the Doppler shifted filtered scanned signal laser light collected from atmospheric space remains continuously within a limited scan wavelength range 132 (labeled in FIG. 3) centered on an absorption well 134 (labeled in FIG. 3) related to the atomic vapor filter 116. Referring to FIG. 3, this keeps the wavelength scan 132 centered on the absorption well 134 even when the Doppler shifted filtered scanned signal laser light shifts wavelength due to changes in air velocity in the atmospheric space 126 (labeled in FIG. 1). Similarly, and referring again to FIG. 1, emitting scanned reference laser light from a first tunable laser 102 can include scanning the reference light over a limited range of wavelengths centered on a reference absorption well related to the first atomic vapor filter 106. The controller 130 calculates air data, e.g. air speed data, based on the difference in wavelength between the center of the reference laser light scan and outgoing signal laser light scan, each controlled to wavelengths which center light received at their respective detectors on the absorption well 134 (labeled in FIG. 3). That difference can be inferred by the Main Controller 130 based on the drive characteristics of those lasers (laser current, laser cavity temperature, or voltage control of piezo-electric actuator driving tuning mirror of an ECLD) or directly measured by tapping a small portion of the reference and channel laser light and bringing them together and causing them to beat against one another due to the frequency difference between them. The method includes outputting the air data 136 to a consuming system of the aircraft on board which the system 100 is situated.

The filtered reference laser light is collected by the first detector 108 and the information is provided to a laser controller 104. The laser controller adjusts the master laser 102 scan range to wavelengths limited to wavelengths within the absorption well. Similarly, each transmit channel detector 118 provides Doppler shifted filtered signal laser light received from atmospheric space information to their associated laser controller 114. This information is used to control the channel laser 112 wavelength scan range to ensure Doppler shifted filtered signal laser light collected from the atmosphere is limited to wavelengths within the absorption well with the center wavelength of the scan at the bottom of the absorption well. Since the light received by the detectors 108,118 include only wavelengths within the absorption wells, all of the information collected is useful in determining the Doppler shift of the signal laser light scattered from atmospheric space. This results in reduced noise in the velocity determination, considerably improved relative to systems scanning the full wavelength spectrum, e.g. comprehensively scanning across a fuller spectrum potentially encompassing multiple absorption wells and all the data between the wells. For the same detection time, a system which limits the wavelength scan range to include only wavelengths inside the absorption wells will collect more useful information as all the data collected is useful in determining the Doppler shift that occurs in the scattering of the signal laser light transmitted into atmospheric space. This ultimately results in a better velocity measurement with reduced output noise.

The controller 114 can control outgoing laser light wavelength of the second tunable lasers 112 to include the usage of engine or other aircraft state data 138 to aid in the control of the limited scan wavelength range 132 (labeled in FIG. 3) to center the scan wavelength range 132 on the absorption well 134 (labeled in FIG. 3). Controlling outgoing laser light wavelength of the second tunable laser 112 can include initializing the limited scan wavelength range 132 (labeled in FIG. 3) to center the limited scan wavelength range 132 on a known absorption well for a known aircraft state. For instance, the known absorption well can be initialized for air at zero airspeed, at a time when the main controller 130 knows the aircraft state is zero speed, e.g. when the aircraft is grounded and stationery. At zero airspeed, the collected light from the atmosphere will contain no Doppler shift and will be at the same wavelength as the reference light. In this case, the main controller 130 can initialize the laser control between 114 and 102 to control to the same wavelength. After initialization, the controllers 114 and 102 can iteratively step the limited scan wavelength range 132 (labeled in FIG. 3) up or down for each wavelength cycle based on a detected shift in absorption well of a previous wavelength cycle, i.e. moving the range 132 which ever direction is needed to re-center it in the Doppler shifted absorption well 134 (labeled in FIG. 3). This process can be performed for as many channels 110 as the system 100 includes. The initialization sequence need not involve using the aircraft state. It may involve a wider wavelength scan determining the location of the absorption wells, then narrowing the wavelength scan to inside those wells. Alternatively, a narrower laser scan could be performed which can be adjusted until the slope of an absorption well is detected, then continue adjusting the controller until in the detected light is centered at the bottom of the absorption well.

Figure 2:
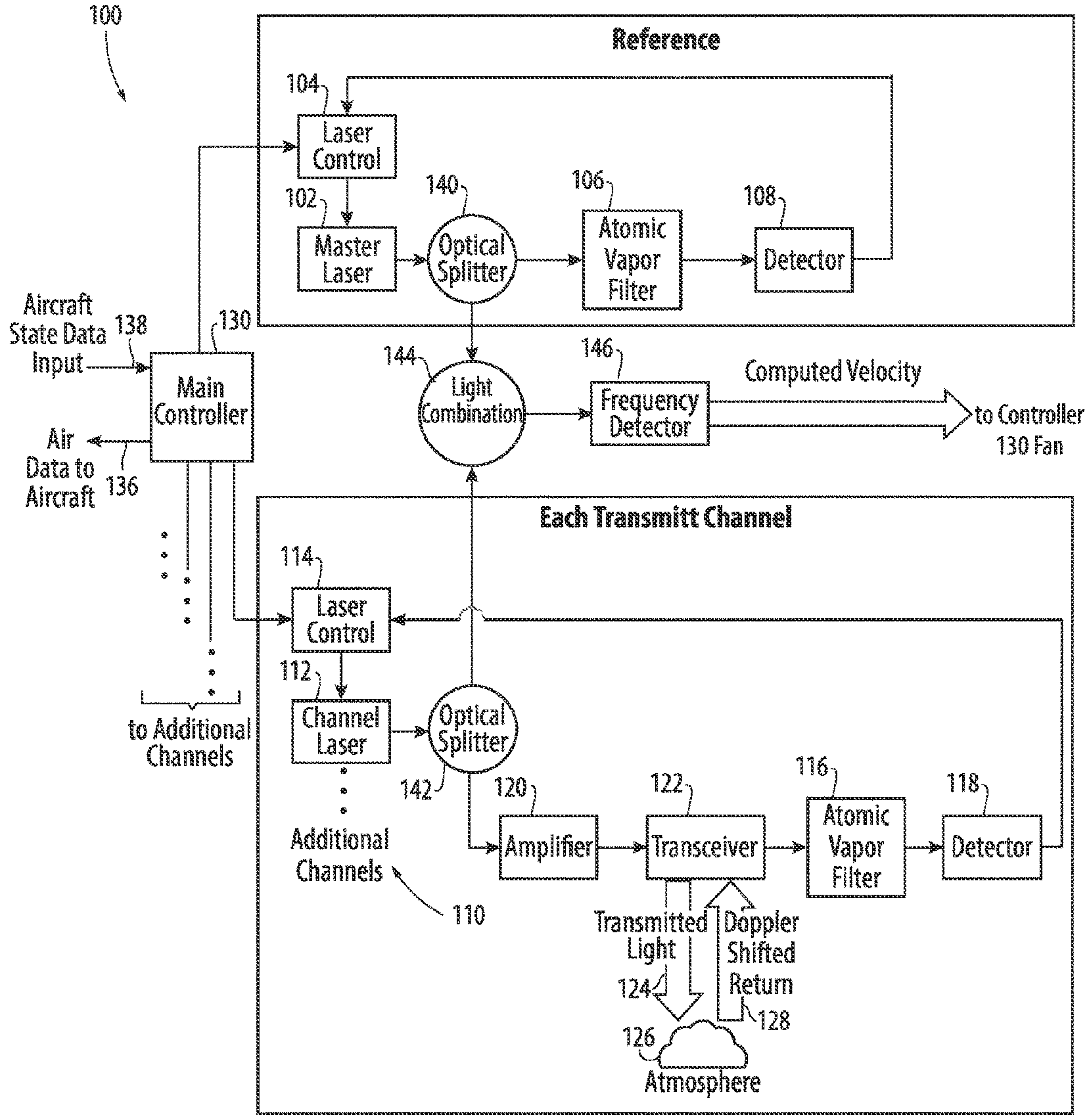
FIG. 2 is a schematic view of an embodiment of the system of FIG. 1, showing a light combiner and frequency detector which can be used for each channel.
Figure 4:
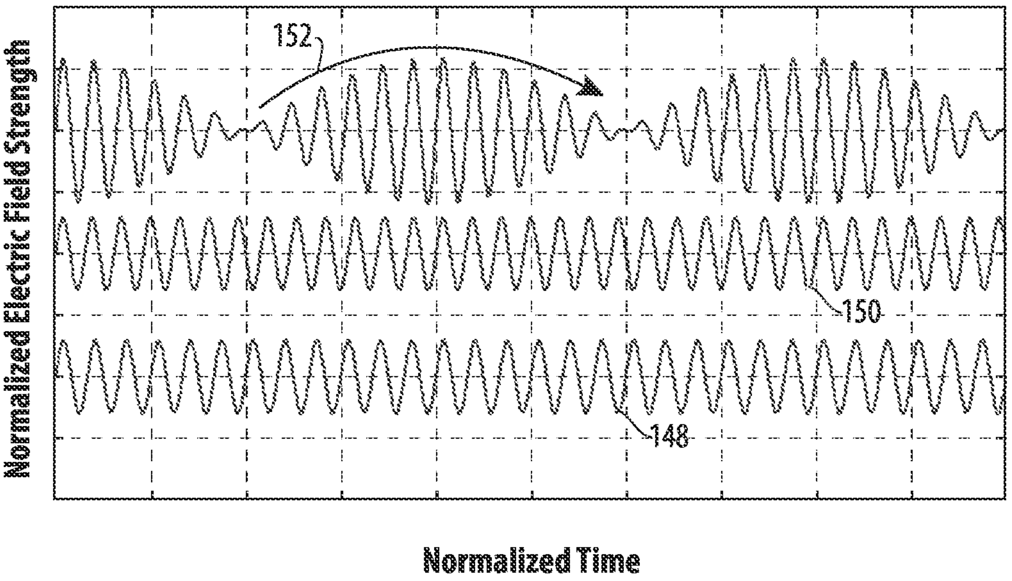
FIG. 4 is a graph showing a signal received from a reference laser, a signal received from an atmospheric laser, and the beat note in the combined optical return signals from both.

With reference now to FIGS. 2 and 4, another configuration of the system 100 utilizes the beat note of the interfering frequencies to determine the Doppler shift. The components of the system 100 as configured in FIG. 2 are the same and operate similarly to those already described above with reference to FIGS. 1 and 3. However, for each transmit channel 110, the system 100 in FIG. 2 includes a first optical splitter 140 operatively connected to split light from the first tunable laser 102. A second optical splitter 142 is operatively connected to split light from the second tunable laser 112 (for each channel 110). Optical splitter 142 must split the laser light prior to the amplifier 120. A light combiner 144 is operatively connected to receive and combine light split from each of the first optical splitter 140 and light split from the second optical splitter 142. A frequency detector 146 receives the combined light from the combiner 144 and is configured to detect the beat note in combined light from the light combiner. FIG. 4 shows the frequency 148 of the first laser 102, the frequency of one of the second lasers 112 (which is shifted in frequency as the controller 114 controls the wavelength scan of the Doppler shifted filtered scanned signal laser light scan to be centered in the absorption well), and the combined light has a beat note 152 indicative of the amount of Doppler shift that occurred in scattering of the signal laser light transmitted into atmospheric space. The frequency detector 146 provides this beat note to the main controller 130, and the main controller 130 is configured to determine air data such as airspeed based on the Doppler shift apparent in the beat note detected in the frequency detector 146.

Systems and methods as disclosed herein provide potential benefits over traditional systems and methods as follows. By controlling the channel laser(s) scan wavelengths such that the Doppler shifted light collected from the atmosphere is centered in the absorption well, a significant increase in useful signal collected per unit time is achieved compared to traditional methods. Existing methods also use an atomic vapor filter as a wavelength reference which can be used to measure the Doppler shift between a reference source of light and light collected from the atmosphere. These existing methods use a single laser for the entire system, which is scanned for a wide enough wavelength range such that the reference absorptive well and the absorptive well from the Doppler shifted light collected from the atmosphere are present within the scan. These methods may also include a scan range wide enough to measure two wells from the atomic vapor filter to provide an absolute frequency reference is the separation between the centers of the two absorptive wells. This wavelength scan includes time spent collecting light that is not in the absorptive well and provide no information regarding the Doppler shift. By controlling the channel laser(s) with an offset which shifts the return light to the center of the well, the entire scan time is spent collecting wavelengths of light within an absorption well. The laser control characteristics used to keep the channel laser(s) centered in the well can be used to determine Doppler shift relative to the reference laser for generating air data. Alternatively, the light from the reference can be combined with a portion of the light prior to being transmitted to the atmosphere and the frequency difference can be measured directly. This provides an advantage over approaches which use multiple atomic vapor filter absorption wells to determine an absolute frequency reference within a wavelength scan.

The methods and systems of the present disclosure, as described above and shown in the drawings, provide for enhance signal to noise ratio in Rayleigh-Brillouin and Mie backscattering air data measurements such as for use aboard aircraft. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method comprising:

emitting reference laser light from a first tunable laser controlled by a first laser control into a first atomic vapor filter to output filtered reference laser light, and receiving the filtered reference laser light with a first detector, wherein the first atomic vapor filter is operatively connected to the first tunable laser to receive the laser light from the first tunable laser and to pass the filtered light to the first detector that is operatively connected to the first laser control for control of the first tunable laser;

emitting outgoing laser light from a second tunable laser into an atmospheric space;

receiving a return of the scan laser light from the atmospheric space into a second atomic vapor filter to output filtered scan laser light;

receiving the filtered scan laser light with a second detector; and controlling wavelength of the outgoing laser light of the second tunable laser to continuously remain within a limited scan wavelength range as needed to for Doppler shifted detected light to be centered on an absorption well related to the second atomic vapor filter even when air velocity changes in the atmospheric space.

2. The method as recited in claim 1, wherein emitting reference laser light from a first tunable laser includes cycling the reference light over a limited range of reference wavelengths centered on a reference absorption well related to the first atomic vapor filter.

3. The method as recited in claim 2, further comprising calculating air speed data based on wavelength of the second tunable laser required for Doppler shifted detected light to be centered in the absorption well difference between wavelength of a center of the absorption well and wavelength of a center of the reference absorption well due to Doppler shift.

4. The method as recited in claim 3, further comprising outputting the air speed data to a consuming system of an aircraft.

5. The method as recited in claim 3, wherein receiving the filtered reference laser light with the first detector includes limiting detection time of the first detector by resetting the first detector each time the refence laser light cycles over the limited range of reference wavelengths to avoid generating data noise from collecting light data not relevant to Doppler shift.

6. The method as recited in claim 3, wherein receiving the filtered outgoing laser light with the second detector includes limiting detection time of the second detector by resetting the second detector each time the outgoing laser light cycles over the limited scan wavelength range to avoid generating data noise from collecting light data not relevant to Doppler shift.

7. The method as recited in claim 1, wherein controlling outgoing laser light wavelength of the second tunable laser includes using engine or other aircraft state data to control the limited scan wavelength range to center the scan wavelength range on the absorption well.

8. The method as recited in claim 1, wherein controlling outgoing laser light wavelength of the second tunable laser includes initializing the limited scan wavelength range to center the limited scan wavelength range.

9. The method as recited in claim 8, wherein a known absorption well is for air at zero airspeed, and wherein a aircraft state is zero speed and grounded.

10. The method as recited in claim 8, wherein controlling outgoing laser light wavelength of the second tunable laser includes, for wavelength cycles after initialization, iteratively stepping the limited scan wavelength range up or down for each wavelength cycle based on a detected shift in absorption well of a previous wavelength cycle.

11. The method as recited in claim 1, further comprising:

combining the reference laser light with the outgoing laser light to output combined laser light to a frequency detector;

detecting a beat note in the combined laser light; and converting the beat note to air speed data.

12. The method as recited in claim 1, further comprising:

emitting respective outgoing laser light from at least one additional tunable laser for each respective one of one or more additional outgoing light channels;

receiving respective returns of the respective outgoing laser light from the atmospheric space into a respective additional atomic vapor filter to output respective filtered scan light for each additional outgoing light channel;

receiving the respective filtered scan laser light with a respective additional detector for each additional outgoing light channel; and controlling respective wavelength of each respective outgoing laser light of the at least one additional tunable laser to continuously remain within a respective limited scan wavelength rage centered on a respective absorption well related to the atmospheric space, even when the respective absorption well shifts wavelength due to changes in air velocity in the atmospheric space.

13. A system comprising:

a first tunable laser operatively connected to be controlled by a first laser control;

a first atomic vapor filter operatively connected to receive laser light from the first tunable laser and to pass filtered light to a first detector that is operatively connected to the first laser control for control of the first tunable laser;

a plurality of transmit channels, each transmit channel including:

a second tunable laser operatively connected to be controlled by a second laser control;

a second atomic vapor filter operatively connected to receive returned laser light from the second tunable laser and to pass filtered return light to a second detector that is operatively connected to the second laser control for control of the second tunable laser; and a controller operatively connected to the first laser control and to the second laser control of each of the plurality of transmit channels, wherein the controller is configured to, for each of the plurality of transmit channels:

control wavelength of the outgoing laser light of the second tunable laser to continuously remain within a limited scan wavelength range centered on an absorption well related to the second atomic vapor filter even when the absorption well shifts wavelength due to changes in air velocity in the atmospheric space.

14. The system as recited in claim 13, wherein each transmit channel includes:

an amplifier operatively connected to amplify the laser light from the second tunable laser to a transceiver, wherein the transceiver is operatively connected to receive the amplified laser light, to transmit the amplified laser light out into an atmospheric space, and to receive Doppler shifted return light from the atmospheric space.

15. The system as recited in claim 13, further comprising for each transmit channel:

a first optical splitter operatively connected to split light from the first tunable laser;

a second optical splitter operatively connected to split light from the second tunable laser;

a light combiner operatively connected to receive and combine light split from the first optical splitter and light split from the second optical splitter; and a frequency detector configured to detect a beat note in combined light from the light combiner, wherein the controller is configured to determine air speed based on Doppler shift apparent in the beat note detected in the frequency detector.

* * * * *